United States Patent [19]
Rudzewicz et al.

[11] Patent Number: 5,440,486
[45] Date of Patent: Aug. 8, 1995

[54] PREDICTIVE ELECTRIC MOTOR POSITIONING DEVICE, NORMAL OPERATING SYSTEM THEREFOR

[75] Inventors: Robert G. Rudzewicz, Sterling Heights; Michael A. Dahl, Royal Oak; Thomas G. Dunn; Kenneth J. Wenzel, both of Farmington Hills; Ronald A. Muckley, Milford, both of Mich.

[73] Assignee: Chrysler Corporation, Highland Park, Mich.

[21] Appl. No.: 71,148

[22] Filed: Jun. 1, 1993

[51] Int. Cl.⁶ ............................. F24F 7/00; B60H 1/00
[52] U.S. Cl. ............................. 364/424.05; 165/42; 165/43; 237/5
[58] Field of Search ................ 364/424.05; 237/5, 28, 237/32; 165/12, 13, 14, 16, 18, 41, 42, 43, 44

[56] References Cited
U.S. PATENT DOCUMENTS

| | | | |
|---|---|---|---|
| 4,316,251 | 2/1982 | Saito et al. | 237/5 |
| 4,744,511 | 5/1988 | Kakehi et al. | 165/42 |
| 4,840,308 | 6/1989 | Akabane et al. | 165/43 |
| 4,949,624 | 8/1990 | Hara et al. | 165/43 |
| 5,027,611 | 7/1991 | Doe et al. | 165/12 |
| 5,209,397 | 5/1993 | Arold et al. | 165/43 |

Primary Examiner—Gary Chin
Attorney, Agent, or Firm—Wendell K. Fredericks

[57] ABSTRACT

A method and firmware motor control and fault operation system for positioning motors of a Heater-Ventilation-Air Conditioner Unit in response to request of chosen comfort levels in the interior of a motor vehicle. The positioning being accomplished by moving the shafts of the motors in a direction and for a period of time determined from mathematical computations. The system controls motor shaft movement of motors arranged to operate as hybrid closed and open loop motor control systems and all motor shaft movement performed with respect to purely time period measurements.

16 Claims, 7 Drawing Sheets

PREDICTIVE ELECTRIC MOTOR POSITIONING DEVICE, NORMAL OPERATING SYSTEM THEREFOR

BACKGROUND OF THE INVENTION

1. Technical Field

A portion of the disclosure of this patent document contains material which is subject to copyright protection. The copyright owner has no objections to the facsimile reproduction of the patent document or disclosure by anyone as it appears in the Patent and Trademark Office patent file or records, but otherwise reserves all copyright rights whatsoever.

The present invention relates to predictive electric motor positioning devices and more particularly to automatic temperature control (ATC) systems using computer controlled electric motors and motor positioning algorithms for controlling motor operations Under normal vehicle power.

2. Background Art

Many computer controlled electric motor systems employ some control system method to perform motor movement functions and to determine proper motor operating parameters. Usually, a calibration-routine which determines various system limits occurs before normal motor control operations. If a normal motor operation problem develops, a fault routine operates to correct the problem or to terminate normal operations.

In prior ATC vehicle networks, electric motors control doors of the heater-ventilation-air conditioner units (HVAC). A calibration algorithm checks for full opening and closing of doors driven by the motors. A computer using controlling software moves the shaft of each door motor in succession in one direction until end-of-travel. Analog-feedback signals from potentiometers associated with each motor provide measured values for the position of each motor which the computer stores in memory. The computer, using the controlling software moves the shaft of each door motor in succession in the opposite direction to obtain and store another end-of-travel feedback signal value. The computer, a microcontroller unit (MCU) dedicated to the system, determines from this stored data whether the door feedback circuit operates properly. This approach defines potentiometer settings at end-of-travel positions but does not yield any information concerning time between ends-of-travel.

U.S. Pat. No. 5,369,342 dated Nov. 29, 1994 of the present inventors discloses a calibration system for performing calibration of a hybrid motor controlled network consisting of closed-loop and open-loop motor systems. This application teaches deriving and storing average ignition voltages and door movement times during ATC system door calibration operations. Such information factors in certain types of mathematical relationships are used in normal and fault operation to effect door movement.

In the past, during normal operation, the ATC system used a control algorithm to calculate a desired position for the motor. The motor control software would then move the motor in the correct direction and constantly monitor the motor analog feedback signal voltage until the value corresponded to the calculated desired position. Some systems use pulse width modulation (PWM) of the motor control signal to reduce the motor speed when approaching the desired position. This PWM approach for reducing motor speed would prevent the motor doors from travelling beyond the desired position.

This past system worked well, but it was highly feedback dependent. Hence, to reduce the dependency of the feedback circuits, for normal operation of the ATC system, it is desirable to utilize the stored average ignition voltages and door movement time. It is also desirable to operate a hybrid system containing close-loop (electric servo) and open-loop (single-ended) door motors without sacrificing effectiveness and creating a need for additional hardware.

SUMMARY OF THE INVENTION

As a solution to these and other problems, the present invention provides an improved system for motor movement, door positioning and fault operation in a computer controlled electric motor system. More particularly, the computer using controlling firmware and hardware moves each motor door to desired positions based on a motor ON-time calculation using feedback, eliminating the need to constantly monitor analog feedback signals of servo motors of the hybrid motor system. The computer calculates the time and direction required to move the motor doors to desired positions. A feedback measurement does not occur until the motor comes to a stop after the computed time expires. Techniques similar to those used in the aforementioned calibration system yield travel extremes and analog feedback voltage data.

For fault operations, firmware generates signals for positioning the motor shafts based upon pure time calculations. Hence, during a feedback fault, stored total time for moving doors between stops allow for determining the amount of time needed to move motor shafts to required positions. Following the failure of an analog feedback signal, the motor door gets positioned to one of the extreme positions to permit initiating motor movement from a known position. The amount of time necessary to move motor shafts to required positions can then be calculated mathematically. Since the motor started at a known position and the travel time between the extremes is known, any possible position can be achieved based on a pure time calculation.

This normal operation and fault detection system provides four (4) benefits namely: (1) it eliminates the need to constantly monitor the analog feedback signal while the motor is moving; (2) it eliminates the need to correct for contact bounce which causes the analog feedback signal to be unstable while the motor is moving; (3) it eliminates the need to reduce the motor speed when approaching the desired position to avoid passing the position; and (4) it eliminates moving the ATC system doors permanently to default locations when analog feedback signal faults occur. The system will continue operating with a reduced accuracy.

DETAILED DESCRIPTION OF A PREFERRED EMBODIMENT

Figure 1:
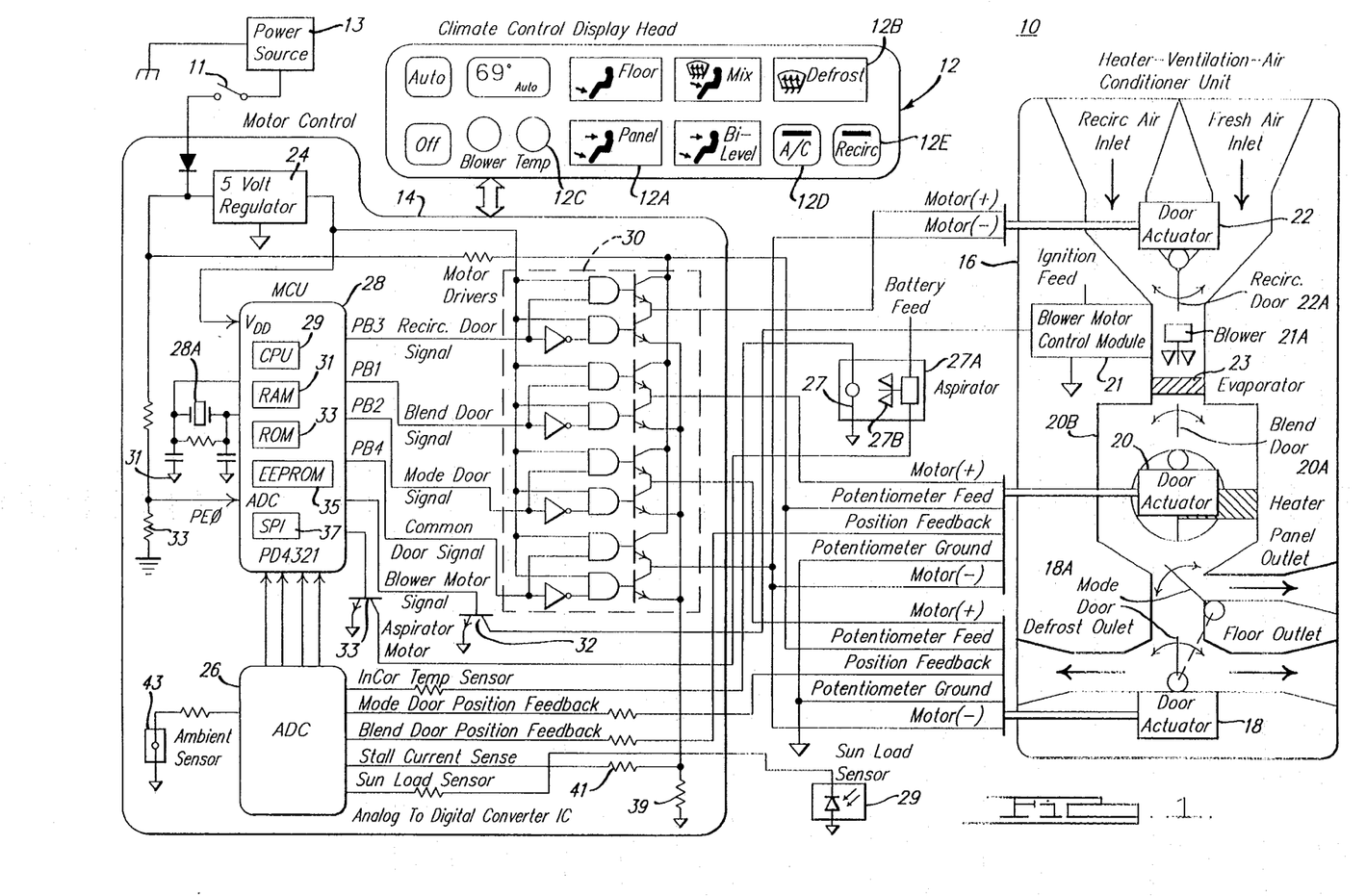
FIG. 1 illustrates in partial schematic and partial block diagram form an ATC system employing the motor control scheme of the present invention.

FIG. 1 illustrates in partial schematic and block diagram form an ATC system 10 employing the motor control scheme of the present invention. System 10 shown in an automobile environment, a preferred embodiment, includes a climate control display panel 12, a motor control circuit 14 and a HVAC 16. Power source 13, normally an automobile battery, supplies power to system 10 after turning ON; illustratively, an ignition switch 11.

The Automatic Temperature Control (SYSTEM)

The Automatic Temperature Control (ATC) system 10 maintains a steady comfort level inside the vehicle during various weather conditions. By placing the temperature control knob 12C at the desired setting and pressing the Auto button 12F, ATC system 10 will position the blend, mode and Recirc doors 20A, 18A and 22A, respectively, to maintain the desired interior temperature. ATC system 10 will also adjust the speed of blower motor 21A to maintain the desired interior temperature.

To maintain the desired comfort setting, ATC system 10 relies on the ambient air temperature sensor 43, in-car temperature sensor 27 and the sun sensor 29. The ambient air temperature sensor 43 located on the front bumper beam of the vehicle senses the temperature outside the vehicle. ATC system 10 uses this temperature information to adjust speed of blower motor 21A and the positions of Recirc door 22A, blend door 20A, and mode door 18A.

The in-car temperature sensor 27, a thermistor, a part of motorized aspirator assembly 27A, mounts in the vehicle instrument panel. A small fan 27B (in the sensor assembly), controlled by NPN switching transistor 33, draws air through an intake on the instrument panel. This air flows over in-car temperature sensor 27 which measures interior vehicle temperature. ATC system 10 then makes adjustments to the speed of the blower motor, positions of blend door 20A, Recirc door 22A and mode door 18A to maintain the in-vehicle temperature requested by the vehicle occupants.

Sun sensor 29 mounts on the top of the instrument panel. Sensor 29, a photo diode, measures sun light intensity. ATC system 10 uses this sun light intensity information to make adjustments to the speed of blower motor 21A and to positions of blend door 20A and mode door 18A.

MCU Control of Normal Operation of the ATC

Normal operation of ATC system 10 occurs after calibrating the Recirc and blend-and-mode doors 22a, 20A and 18A, respectively. If, after calibrating the door motors, the doors rest without movement and there exists no feedback stabilizing wait states, then MCU 28 checks the door position request placed in memory to determine if the current door position matches a requested door position. MCU 28 checks the position of Recirc door 22A first, mode door 18A next and then blend door 20A.

Outside Air/Recirc Air Door and Motor

The outside air/Recirc air motor 22, a single-ended motor uses a linkage to mechanically position the outside air/Recirc air door 22A in the open or closed position. Motor drivers 30 of the motor control 14 provide drive signals to motor 22 in response to control signals from MCU 28. Motor 22 does not contain a feedback potentiometer to communicate back to MCU 28 the position of the outside air/Recirc air door.

Position checks of the Recirc door consist of comparing a previous door position value with the requested door position (equation 3A). If the previous door position value does not match the requested door position value, MCU 28 supplies control signals used to cause movement of the Recirc door from either outside air to recirculated air or vice versa.

During automatic Recirc operations, MCU 28 provides control signals to move the Recirc door from full Recirc to outside air using 20 individual positions. The manufacturer of the HVAC unit 16 dictated "20" as the number of positions in this mode of operation.

MCU 28 uses equations (3) and (3A) shown below to calculate the Recirc door positions:

Desired Recirc Door Position =            (3)
   (Requested Position X Calibration Time)/ 256 —
                                    Old Motor On-Time.

Where:
Old Motor On-Time = Length of Time in 1/32 second that motor was previously turned ON = current position.
Another way of expressing Equation (3) follows:

Desired step position =                             [3]
            Current Req. position — Current position.
(Note: When the results of Eq. (3) $\neq$ 0, then current position is set to the current Req. position value for use the next time that the Recirc requested and current positions are compared. The current Req. position value remains the same. Eq. (3) is then recomputed and repeated if necessary until Eq. 3 = 0 and the Position Error (shown in Eq. 3A) is 0.)
    Position Error = Req. position — current position (3A)

Mode & Blend Doors and Motors

The mode door motor 18 and the blend door motor 20, electric motors with feedback, use linkages to mechanically position the associated doors. Mode door 18A positions the panel/bi-level and the floor/defrost doors while the blend door 20A causes heated air, unheated air or a blend of air to the chambers associated with the mode door 18A. Both door motors contain a feedback potentiometer which allows MCU 28 to know the exact position of the doors at all times. Motor drivers 30 provide drive signals to both door motors in response to control signals from MCU 28.

At the inlet of the blend door duct 20B, a blower motor control module 21 operates blower 21A which controls the flow of either Recirc or outside air which routes through evaporator 23 for cooling if the air condition unit is ON. An NPN switching transistor 32 controlled by control signals from MCU 28 turns OFF and ON the blower control module 21. Within one of the two chambers of blend door duct 20B, air directed by the blend door 20A passes through a heater 25 in order to supply heated air to the panel/bi-level and the floor/defrost doors.

MCU 28 checks the door position request locations in memory to determine if the current door positions match the requested door positions. For both the mode and the blend doors, this check consists of comparing the result of Equation (1) below with the current analog feedback signal. If the current analog feedback signal is not within the required A/D count deadband ($\pm 10$) from the calculated value, as determined by equation 1A, the door motor is turned ON for a set time interval based upon equation (2).

Equation (1) follows:       (1)
Desired analog motor position =
   ((Stop 1-Stop 0 )) × (Requested Position ÷ 256)) + Stop 0.
Where:
Stop 1 = Measured analog feedback signal with motor driven to stall in the forward direction.
Stop 0 = Measured analog feedback signal with motor driven to stall in the reverse direction.
Requested position = Value from 0 to 255.

If the current analog feedback signal is not within the required A/D count deadband ($\pm 10$) from the calculated value as determined by the result of equation 1A, the door motor is turned ON for a set time interval based upon Equation (2). Equation (1A) is as follows:

Error = Current analog feedback position −
                           desired (1A) analog feedback position.
(Note: If Error is positive, move the motor shaft forward; if error is negative, move the motor shaft in reverse.)
Motor ON-time = ((Current Position − New Position) ×
   (2) (Calibration Time + (Averaged System Voltage −
                   Current System Voltage))) ÷ (Stop 1 − Stop 0).
Where:
Current Position = Current analog feedback signal.
New Position = Position calculated using equation (1).
Calibration time = Time in 1/32 second for door to travel from reverse stall to forward stall.
Average system voltage = (Summed voltage ÷
                           (Calibration time ÷ 4))
Current System Voltage = Current measured system voltage.
(Note: To prevent any problems with changing from Recirc air to outside air, the mode door 18A set time interval has a maximum allowable value of 8 seconds. If the calculated set time interval exceeds 8 seconds for the mode door, this change will be executed in two parts with the first interval being 8 seconds. This allows the Recirc door position request location to be checked at least every 8 seconds during a mode door move. This is required because air should not be recirculated with the mode door in certain positions.)

Time limits provide for detecting abnormal stall conditions of both open and closed loop motors. Exceeding a time limit provides an indication of the presence of an electrically unattached motor, a defective motor or defective attached mechanical structure.

The average system voltage data compensates the motor ON time calculations for motor torque variations caused by rising and falling system voltage.

Motor Control Circuit

The motor control circuit 14 includes motor driver circuit 30 for driving door motors in ATC system 10. Switching transistors 32 and 33 control power to a blower motor control module 21 and motorized aspirator assembly 27A. MCU 28 provides control signals to driver circuit 30 and contains a serial peripheral interface (SPI) 37 connected to an external analog-to-digital converter (ADC) 26. ADC 26 accepts analog signals from the potentiometers (not shown) associated with the blend and mode door motors 20 and 18, respectively, and converts the analog signals into digital signals routed to MCU 28 through SPI 37. A five-volt regulator 24 supplies regulated power to MCU 28 and driver 30. Driver 30 also uses raw DC voltage, usually 12 VDC from power source 13. In a preferred embodiment, a MC68HC11 high-density CMOS (HCMOS) single-chip microcontroller from Motorola Inc. of Phoenix, Ariz. serves as MCU 28; a MC145051 analog-to-digital converter also from Motorola Inc. serves as ADC 26, and a LM 18298, dual full-bridge driver from National Semiconductor Corp. of Santa Clara, Calif. serves as motor driver 30. An internal A/D converter associated with port E of the MC68HC11 microcontroller receives an input signal from voltage divider network resistors 31 and 32 for sensing changes in ignition voltage.

Software Operations within the MCU

In a vehicle, the CPU 29 of MCU 28 shares software operations with several other systems associated with the vehicle. However, the program for normal operation of the ATC system door motors resides in a background routine (a noninterrupt routine) or the main program. Interrupt signals from the climate control display head 12, power source 13, a reset IC (not shown) or 500 $\mu$s pulses from an internal output compare circuit do interrupt the background routine during normal operations.

A $\frac{1}{8}$ second measured interval from a RAM based counter generates in the background program after enough 500 $\mu$s interrupts signals exit an internal output compare circuit in MCU 28. As mentioned supra, the output compare signal occurs every 500 $\mu$s. The RAM based counter increments every time the output compare signal appears. When this counter reaches 62 (31 ms.) or 63 (31.5 ms.) (the required value alternates to generate a 62.5 (31.25 ms.) average count), a 1/32 second task in a task dispatcher is queued. A RAM based counter associated with this 1/32 second task is incremented and is used to determine when to queue the 1/16, $\frac{1}{8}$, $\frac{1}{4}$, $\frac{1}{2}$, 1, 2, 4 and 8 second tasks for execution by a background program task dispatcher. This embodiment uses the 1/32 second task, the interval of the motor-control routine; and the $\frac{1}{8}$ second task, the interval of the normal operation routine.

State Diagrams

The Normal and Fault Operation States

Figure 2A:
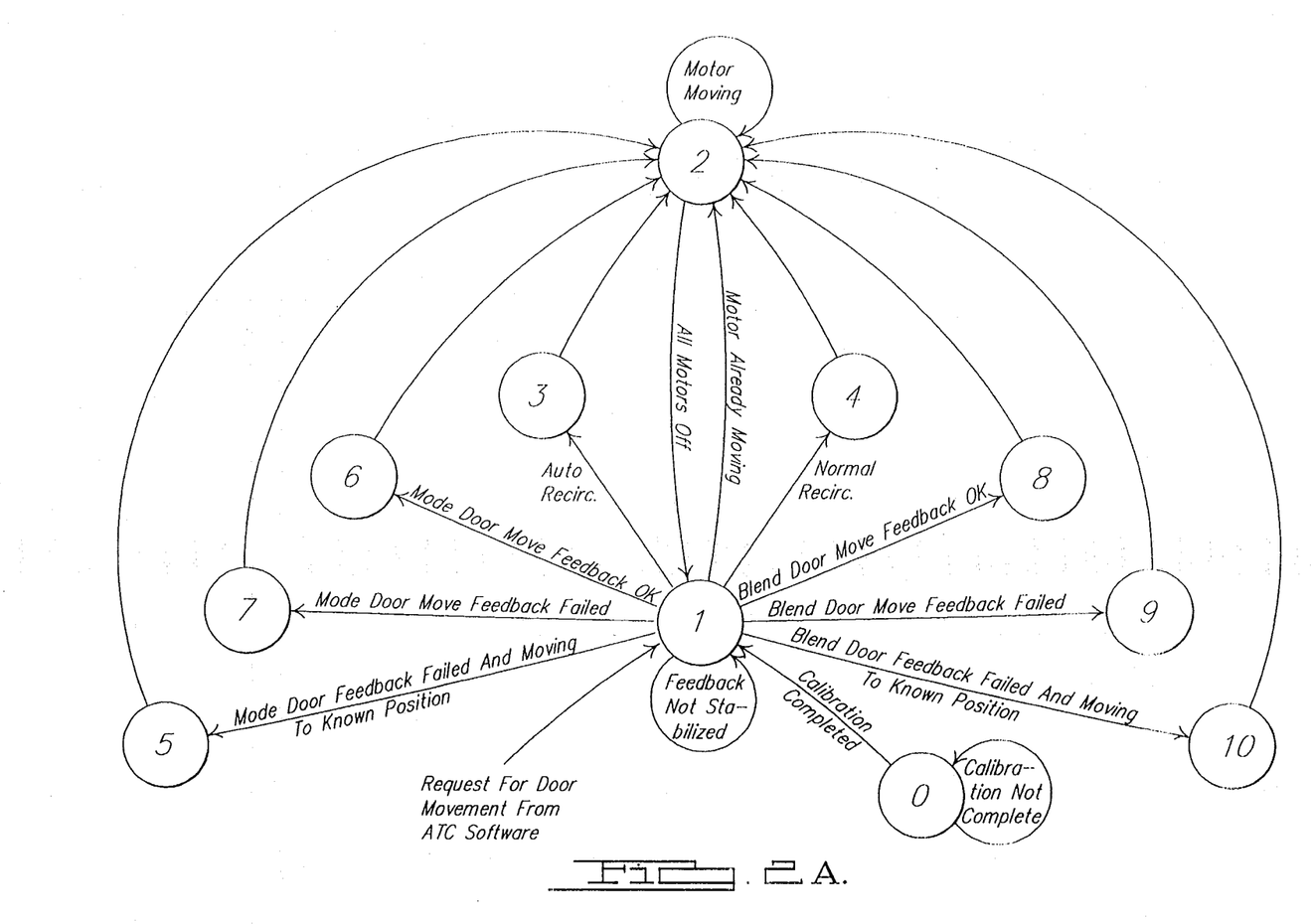
FIG. 2A depicts a state-transition diagram of system operations for performing normal and fault operations.

Firmware for CPU 29 employs a sequence of transition states used to step through various operations required to operate the motors. FIG. 2A depicts these normal and fault operation states. Nodes (0–10) designate the internal states and arcs, with arrow heads attached thereto and connected between nodes depict input/output conditions that cause transitions between states. FIG. 2A shows one input signal (the request for door movement signal from the CPU). However, entry to and exit from the various internal states of the state diagram of FIG. 2A occur during the course of a subprogram.

Table 1 presents a listing of internal states and operations associated with each normal and fault operation state. The listing contains the sequence of states executed by CPU 29.

TABLE 1

| State # | Operation Performed |
|---|---|
| 0 | Calibration not completed (Cal State < 15) |

TABLE 1-continued

| State # | Operation Performed |
| --- | --- |
| 1 | All motors OFF |
| 2 | One motor on (Mode, Blend, or Recirc) |
| 3 | Automatic Recirc door control requested |
| 4 | Normal Recirc door control requested |
| 5 | Mode door moving to known starting position due to failed feedback signal |
| 6 | Move mode door based upon feedback signal and calibration time |
| 7 | Move mode door based upon calibration time calculations only |
| 8 | Move blend door based upon feedback signal and calibration time |
| 9 | Move blend door based upon calibration time calculations only |
| 10 | Blend door moving to known starting position due to failed feedback signal |

The Normal and Fault Operation States (cont.)

Included in FIG. 2A for each internal state, labels above or below the connecting arcs designate transition states. Transition states help describe what condition causes the program to change from one state to the next. For example, a calibration completed signal from state 0 represents the transition state to state 1. A calibration not complete signal causes state 0 to repeat until calibration is completed.

The ATC Door Motor Control States

Figure 2B:
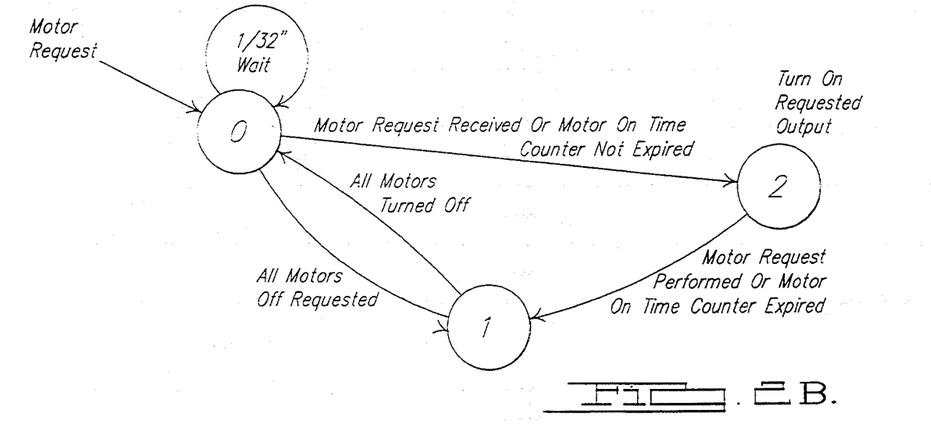
FIG. 2B depicts a state-transition diagram of operations of the ATC System motor control system during normal and fault operations.

Firmware for the CPU employs a sequence of states for stepping through the various operations required to control the door motors. FIG. 2B depicts these states.

Table 2 presents a listing of the states and operations associated with each state. The listing contains the sequence of internal states executed by the CPU.

TABLE 2

| State # | Operation Performed |
| --- | --- |
| 0 | Wait for motor request |
| 1 | Turn OFF all motors |
| 2 | Execute motor request |

ATC Door Motor Normal and Fault Subroutine

Refer now to FIGS. 3 through 7. There, a series of flow charts depict firmware instructions to CPU 29 which include cross references to the various internal states depicted in FIGS. 2A and 2B. These flowcharts represent an effort to organize the generation and flow of system 10 signals. The structure differs from conventional box and diamond flow charts.

In these charts, signals entering and leaving the flow of control pass along lines and proceed down the page. Conventional start-of-program and end-of-program boxes exist. Trapezoidal or rectangularly shaped boxes indicate signals entering and leaving the flow of control. A small circle on the lines signifies action, the description of the action appearing adjacent to the circle to the left or right of the flow lines. When introducing a decision, the flow line branches to the right or left of a small decision box containing a YES or NO statement signified by a Y or N within the box. Without a branch, the main flow routes to the next circle or decision box. In cases of branching to a secondary flow path, after execution of the instructions in that path, an arrowhead depicts where the secondary flow rejoins the main flow. A reference number indicates the position or step along the line being discussed.

Normal Operation

STATE 0 Calibration Not Completed

As mentioned supra, calibration of the motors take place prior to entering normal and fault operations. At step 3a of FIG. 3, the ⅛ second ATC Door Motor Normal Operation routine, CPU 29 determines if calibration is complete. If not, CPU 29 branches and exits the normal routine and returns to the calibration routine to receive firmware instructions for completing calibration. If calibration is complete, CPU 29 then enters state 1 and executes the instruction at step 3b.

State 1 All Motors Off

Figure 3:
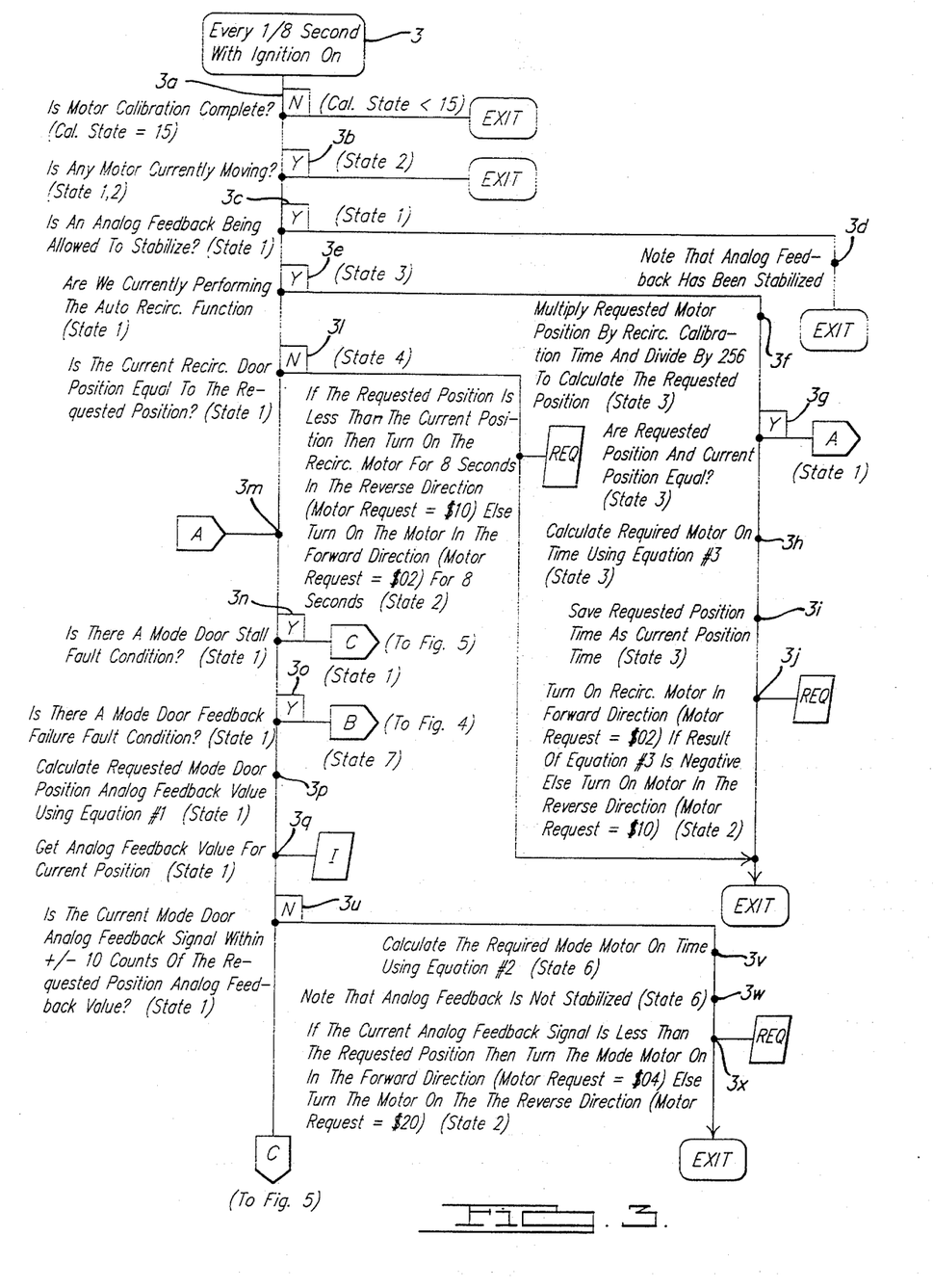
FIGS. 3 through 5 illustrate in flowchart form operations performed during ⅛ second intervals of normal system operation, the flowcharts containing notations referencing the various normal operation states of FIG. 2A.

Step 3a requires no movement of the shafts of all motors. If one motor operates, then CPU 29 must exit the normal operation routine and reenter in state 2 until all motor shafts rest in the OFF state. If the shafts of all motors rest in the OFF state, then CPU 29 executes the instruction at step 3c (state 1).

If the motors are turned OFF but the analog feedback signal of either of the two servo motors has not yet stabilized, then in step 3c (state 1), CPU 29 decides if an analog feedback signal must stabilize before continuing. If so, CPU 29 takes the branch to step 3d and follows the instruction at step 3d to note that the analog feedback has been stabilized before exiting the normal operation routine. If both analog feedback signals rest in a stable condition, then CPU 29 follows the instruction at step 3e (state 1).

States 1: Recirc Door Motor Turned On

Step 3e requires CPU 29 to branch to step 3f if the Recirc door motor is being operated automatically. If not, CPU 29 executes the instruction at step 3l. Assuming that the Recirc door is not being operated automatically, then CPU 29 executes the instruction at step 3l (state 1) which requires a decision as to whether the current Recirc door position equals the requested door position. Requested door position results from a vehicle occupant activating the Climate Control Display Head Recirc Button 12E of FIG. 1. In normal operation, the Recirc door rest either in 100% outside air position or 100% Recirc air position. Hence, if the current Recirc door position equals the requested door position, then the Recirc door motor is not turned ON for 8 sec. Equation (3A) permits computing the error between the current Recirc door position and the requested position.

State 2: Moving Recirc Door to Requested Position

Assuming an error exists, CPU 29 branches to step 3z (state 4). If the requested position is less than the current position, then CPU 29 sends a $10 motor request command to the motor control firmware of FIG. 7 to turn ON the Recirc motor in the reverse direction. Else CPU 29 sends a $02 motor request command to turn ON the Recirc motor in the forward direction. CPU 29 also sets the motor ON timer to 8 seconds regardless of the direction that the motor is being driven (state 2). The motor control firmware instructs CPU 29 to turn on the motors and measure ON-time in 1/32 second intervals. Hence, for 8 seconds to expire, the motor control routine must operate 256 times. During that time span, the normal operation firmware is revisited 32 times. During the revisits, CPU 29 reexecutes the instructions up to step 3b (state 2) until expiration of the 8 seconds of until a door stall has occurred because an end of travel was reached. CPU 29 then exits the normal operation program in state 2 and reenters during the next ⅛ interval.

State 1: Recirc Door in the Desired Position

At step 31, if the current Recirc door position is equal to the requested position (state 1), then no change to the Recirc door is required so the firmware proceeds to check the mode door.

State 3: Auto Recirc Function

The auto recirc function occurs rarely. Mainly under cool down conditions when the vehicle is hot and hot temperatures exist outside the vehicle. The driver has no control over the auto Recirc function except to cancel it by pressing the Recirc button on the ATC climate control head.

Assuming during the ⅛ second routine, CPU 29 follows the firmware instructions in FIG. 3 down to step 3e. In step 3e, CPU 29 receives instructions to determine if system 10 is currently performing the Auto Recirc Function. If so, then CPU 29 branches to step 3f.

At step 3f, CPU 29 receives the instruction to multiply the requested motor position (determined from the in-car temp sensor) by the Recirc calibration time (stored in memory) and then divide this product by 256 to calculate the position desired by CPU 29.

At step 3g, CPU 29 determines if the requested position and the current position are equal. If not equal (the undesirable condition), CPU 29 moves to the instructions at step 3h to calculate the required ON time using equation (3) (now in state 3). Following this calculation, CPU 29 receives the instruction to save the requested position time as current position time.

At step 3j, CPU 29 receives the instructions to turn ON the Recirc door motor in the forward direction (motor request $02) if the results of equation (3) is negative or else turn ON the motor in the reverse direction (motor request $10) if the results are positive before exiting the ⅛ second routine.

State 1: Determining if the Mode Door is in the Desired Position

CPU 29 will reenter during the next ⅛ second interval and proceed to step 3n if the analog feedback is stabilized and the Recirc door is in the requested position. Step 3n (state 1) requires CPU 29 to look for a mode door stall condition. If a mode door stall fault is present, then CPU 29 branches to the program in FIG. 5 which controls blend door movement. This occurs because a mode door stall is a major catastrophe which system 10 will not try to overcome. If a mode door stall fault has not occurred, then CPU 29 follows the instruction at step 3o (state 1) requiring CPU 29 to determine if a mode door feedback failure fault condition exist.

If a mode door feedback failure fault condition does not exists, CPU 29 executes the instruction in step 3p (state 1) which requires computing desired mode door position analog feedback value using equation (1). The ATC system, a conventional ATC system such as the one found in the 1993 Chrysler Concorde vehicle, contained in firmware in CPU 29 uses sensed values from ambient sensor 37, the sun load sensor 29 and the in-car temp sensor 27 to determine the requested position. The motor control firmware in CPU 29 then uses this requested position and the stored values for Stop 1 and Stop 0 determined during calibration to calculate the desired analog feedback position using equation 1.

State 6: Determining if the Mode Door is in the Desired Position

After computing the desired mode door position value, CPU 29 gets the mode door analog feedback value for the current position at step 3q (state 1). Then CPU 29 computes the error by using equation (1A) in step 3u. If the current mode door analog feedback signal is within ±10 counts of the requested position analog feedback value, then the mode door is in the desired position and CPU 29 will exit the mode door program and go to the program in FIG. 5 used to move the blend door.

If the current mode door analog feedback signal is not within ±10 counts of the requested position analog feedback value, then CPU 29 branches to step 3v and calculates the required mode motor ON time using Equation (2) (Now in state 6).

State 6: Calculating the Mode Door Motor on Time and Direction if the Current Position does not Match the Requested Position Equation (2) requires using the current analog feedback obtained in step 3q, the new position value computed in Equation (1), the calibration time, the average system voltage and the stop 1 and 0 values determined during the calibration procedures and the current system voltage measured by the internal ADC at port PE0 of MCU 28.

After computing the required mode motor ON time using equation (2), CPU 29 receives instructions at step 3w to note that the analog feedback has not stabilized. Then at step 3x, CPU 29 processes the instructions to send a request to the 1/32 second motor control routine to drive the mode motor in the forward direction (motor request byte=$04) if the current analog feedback signal is less than the requested position. If not, then CPU 29 processes the instruction to drive the mode motor in the reverse direction (motor request byte=$20) before exiting the routine. The firmware is now in (State 2).

State 2: Driving Mode Door: ATC Motor Control

Figure 7:
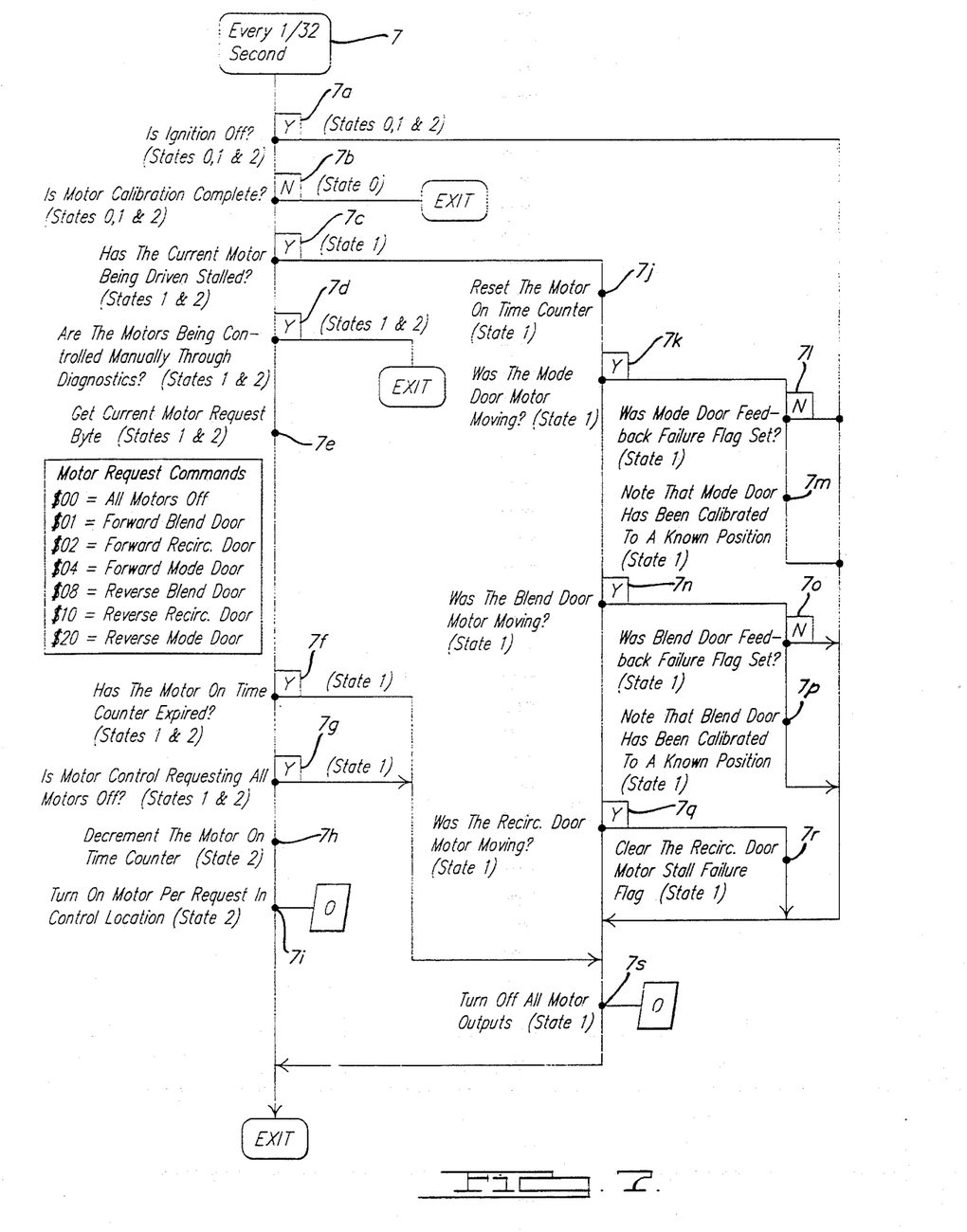

Turning now to FIG. 7 of the 1/32 second ATC motor control routine, note at step 7, a clock cycle initiates this routine every 1/32 second. CPU 29 receives instructions at step 7a to determine the status of the ignition switch. If detecting an analog ignition voltage (AIGN) ignition ON signal at step 7a, CPU 29 will not branch. If the ignition voltage is OFF, CPU 29 branches to step 7s and receives the instruction to turn OFF all motor outputs.

While still in state 0, at step 7b, CPU 29 receives instructions to investigate the status of the calibration routine. No branching occurs since CPU 29 will find a calibration complete condition (MSCALCOM). Processing will move to step 7c.

At step 7c, CPU 29 receives the instruction to determine whether the current motor being driven has stalled. Since the motors are not moving, no branching takes place.

At step 7d, CPU 29 receives the instruction to determine whether the motors are being controlled manually through diagnostics. Since they are not, CPU 29 then processes the instruction at step 7e requiring reading the current motor request byte.

Assume a "drive the mode door motor forward" request was generated by the normal operation software, then at step 7f, CPU 29 receives the instruction to determine if a motor ON-time counter formed in RAM 31 expired. Assuming it has not expired, CPU 29 then determines whether the motor request command is for all motors OFF. Since the request command was for moving the mode door forward, CPU 29 does not branch but moves to step 7h where the instruction causes CPU 29 to decrement the motor ON-time counter (now in state 2).

At step 7i, CPU 29 updates port B to drive the mode door in the forward direction indicated by a $04. CPU 29 will follow the instruction at step 7i to send a mode door motor forward control signal to motor driver circuit 30 of FIG. 1 before exiting the 1/32 sec. motor control routine to return to the Normal operation program. This signal provides a positive polarity signal at port PB2 and a negative polarity signal at the blend, Recirc, and common door signal lines of port B.

Assuming the mode door motor moves in the forward direction, then on the next 1/32 sec., CPU 29 reenters the 1/32 sec. motor control routine and receives instructions at step 7c to determine if the current motor being driven has stalled. CPU 29 decides motor stalls by measuring the A/D Stall Sense signal (SVRSENRW) from the A/D converter 26 of FIG. 1. If a stall condition exists, CPU 29 branches to the instruction at step 7j which requires resetting of the motor ON-time counter (state 1) before proceeding to step 7k.

Step 7k instructs CPU 29 to determine whether the mode door was moved. Since it was moved, CPU 29 branches to step 7l where CPU 29 receives the instruction to determine if the mode door feedback failure flag was set. If the mode door feedback failure flag was set, CPU 29 will receive the instruction to note that the mode door has been calibrated to a known position and then move to the instruction at step 7s. If the flag was not set, CPU 29 receives the instruction to proceed to step 7s directly. Step 7s provides the instruction to CPU 29 to turn OFF all motor outputs. CPU 29, after receiving the instruction to turn OFF all motors indicated by a $00, will provide the all motors off control signal (MTROFF) to motor driver circuit 30 of FIG. 1. This signal will remove power at port B to all the motors.

State 5: Moving the Mode Door to a Known Position After a Feedback Failure

An analog feedback failure on either the mode or blend door will cause: (1) an open-loop condition to occur and (2) the normal operation calculations to be bypassed. When the feedback fails, the door motor will be moved to one of the two HVAC unit end positions (defrost for the mode door and full heat for the blend door). This movement allows the door to be placed in a known starting position and are the desired positions for the doors should a stall failure occur. The door position will then be calculated using Equation #3 shown in the normal operation section. A deadband of ±3 in the motor ON-time value is used to prevent the motor from oscillating between positions. If a motor with failed feedback is moving when ignition is turned OFF, the motor will be returned to the known starting position once ignition has been turned ON. This operation prevents the time based motor control software from losing accurate control of the door position.

Figure 4:
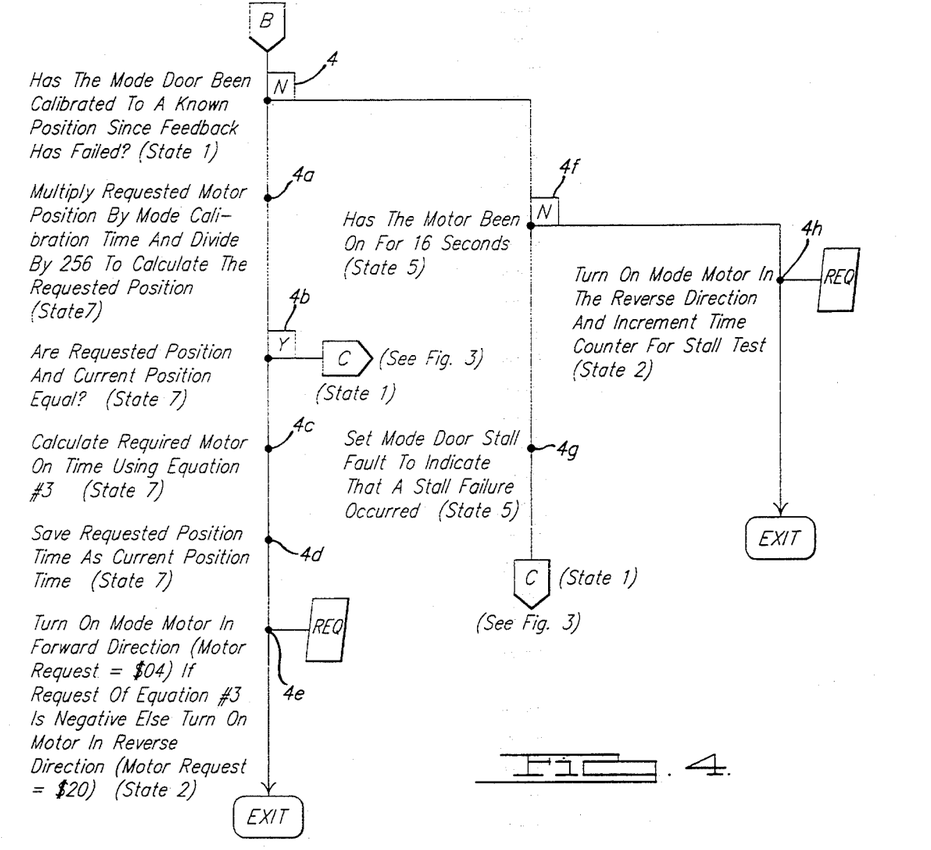

At step 4 of FIG. 4, if the mode door had not been calibrated to a known position since feedback failure, CPU 29 branches to step 4f and receives the instructions to determine if the mode door motor has been ON for 16 seconds. If so, CPU 29 follows the instructions at step 4g which requires setting the mode door stall fault byte to indicate that a stall failure occurred (state 5). Afterwards, CPU 29 then proceeds to the firmware program of FIG. 5 and investigates the blend door.

If the mode door has not been on for 16 sec., then CPU 29 branches to step 4h and follows the instruction to turn on the mode door motor in the reverse direction by sending the 1/32 second motor control firmware a $20 request. The time counter for the stall test is then incremented (state 2). The stall test is a mechanical test of the system since an end of travel should be reached when the door is driven continuously in one direction. CPU 29 then exits the fault operation firmware.

State 7: Moving the Mode Door Motor for a Calculated on Time After the Mode Door had been Moved to a Known Position If the mode door has been calibrated to a known position, then CPU 29 does not branch but follows the instruction at step 4a. At step 4a (now in state 7), CPU 29 receives the instruction to multiply the requested motor position by the mode calibration time and then divide that product by 256 to calculate the desired position in terms of motor ON time. At step 4b, if CPU 29 determines that the desired position does not equal the current position, then CPU 29 follows the instruction at step 4c which requires CPU 29 to calculate the required motor ON time using equation (3) (state 7). Then CPU 29 receives the instruction at step 4d to save the requested position time as the current position time (state 7). Then in step 4e, CPU 29 receives instructions to turn ON the mode door motor in the forward direction (motor request $04) if the results of equation (3) is negative or else turn ON the mode door motor in the reverse direction (motor request $20) if the results of equation (3) is positive.

Figure 5:
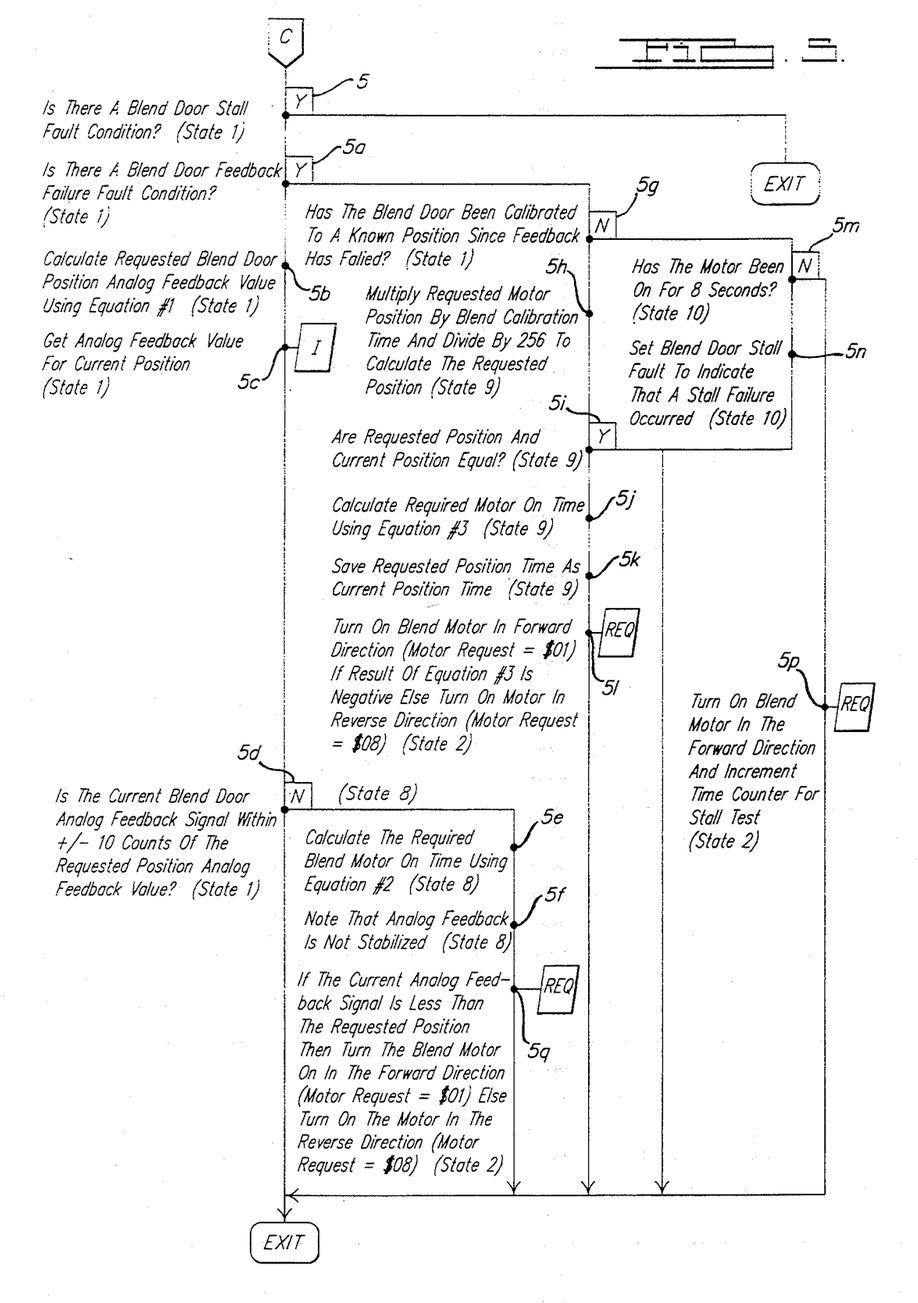

If at step 4b, the desired position equals the current position, then CPU 29 branches to step 5 of FIG. 5 through point "C" to perform the blend door motor control function (state 1).

Blend Door Activities State 1; Determining if the Blend Door is in the Desired Position Determining if the blend door is in the desired position is performed in state 1 in the same manner as for the mode door. Referring to FIG. 5, step 5, a blend door stall check instructs CPU 29 in the same manner as for the mode door.

State 8: Moving the Blend Door to the Desired Position in the Correct Direction

State 8 for the blend door requires the same operations as does state 6 for the mode door.

State 2: Driving the Blend Door: ATC Motor Control

Motor control for the Recirc door, mode door and blend door motors operate in basically the same manner. CPU 29 uses the same firmware instructions provided in FIG. 7 to affect motor movement except for clearing door stall failure flags (see steps 7k through 7r).

State 10: Moving the Blend Door to a Known Position After a Feedback Failure

State 10 for the blend door requires the same operations as does state 5 for the mode door except for the time required to move the blend door to a known position. The time for maintaining the mode door motor ON to move the mode door to a known position is 16 sec., while the time to move the blend door to a known position is 8 sec. This is due to the physical difference between the door due to angular travel.

State 9: Moving the Blend Door Motor for a Calculated on Time After the Blend Door had been Moved to a Known Position State 9 for the blend door requires the same operations as state 7 of the mode door including the use of the same equation 3.

Upon Turing Ignition Off

Figure 6:
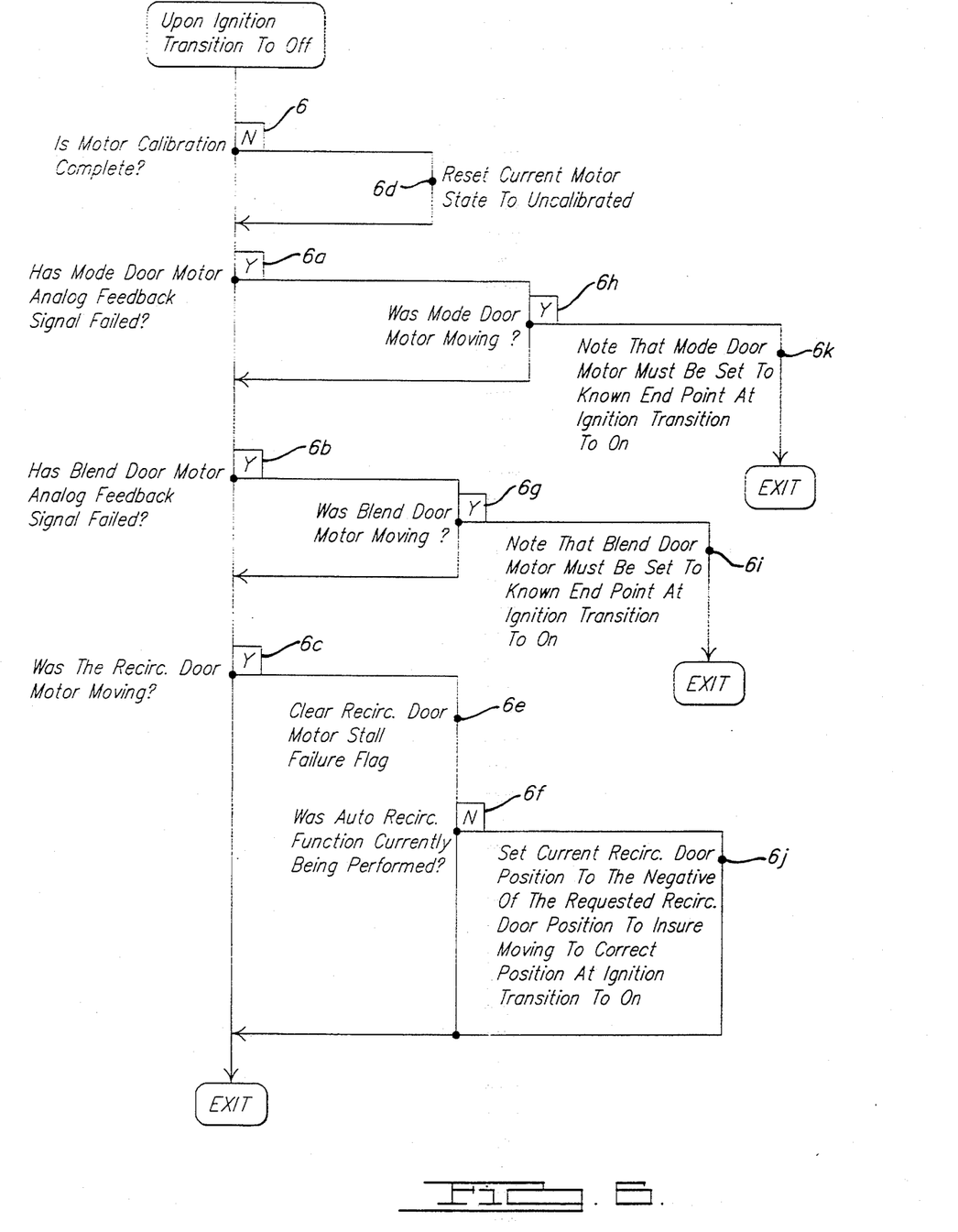
FIGS. 6 and 7 illustrate in flowchart form the operations performed during 1/32 second intervals of motor control, the flowcharts containing notations referencing the various motor states of FIG. 2B.

Turning to FIG. 6, there CPU 29 at step 6 checks to see if motor calibration is complete. If not, CPU 29 branches to step 6d and resets the current motor state to uncalibrated so that a complete calibration will be performed during the next ignition ON condition.

Then CPU 29 determines whether the mode door motor analog feedback signal failed. If so, CPU 29 branches to step 6h and determines any movement of the mode door motor shaft. If so, CPU 29 notes that the mode door motor must be set to the known end point at ignition transition to ON at step 6k before exiting the program.

If the mode door was not moving or did not have a failed feedback condition, CPU 29 checks to see if the blend door motor analog feedback signal failed. If so, then CPU 29 determines any movement of the blend door motor shaft. If so, CPU 29 notes that the blend door motor must be set to the known end point at ignition transition to ON at step 6i.

At step 6c, CPU 29 determines any movement of the Recirc door motor shaft. If so, CPU 29 clears the Recirc door motor stall failure flag at step 6e.

At step 6f, CPU 29 determines if an auto Recirc function was currently being performed. If not, then at step 6j, CPU 29 sets the current Recirc door position to the negative of the requested Recirc door position to insure moving to correct position at ignition transition to ON.

Operation of the System

To predict the operation of automatic temperature control systems and associated door moving mechanical gearing and linkage under normal operating power, travel time and voltage change data must be compiled. This system efficiently regulates ATC Motor movement of the air deflection doors.

As mentioned supra, the ATC system employs both open and closed loop motor networks for controlling movement of the mode, blend and recirculation (Recirc) doors. The mode and blend door motors provide analog feedback signals which indicate the present door positions. The Recirc door motor provides no feedback signal, but motor on-time governs motor movement.

Assumptions

To illustrate the operation of the ATC system, use of sample data to show both closed-loop and open-loop network reactions follows. Assume the following data:

TABLE 3

| | |
|---|---|
| Ignition Voltage Level | 200 (13.5Vdc in A/D counts) |
| Mode Door Stop 0 Value | 102 (0.5 Vdc in A/D counts) |
| Mode Door Stop 1 Value | 921 (4.5 Vdc in A/D counts) |
| Mode Door Calibration Time | 192 (6 sec. in 1/32 sec increments) |
| Mode Average Ignition Voltage | 200 (13.5 Vdc in A/D counts) |
| Blend Door Stop 0 Value | 204 (1.0 Vdc in A/D counts) |
| Blend Door Stop 1 Value | 819 (4.0 Vdc in A/D counts) |
| Blend Door Calibration Time | 96 (3 sec. in 1/32 sec. increments) |
| Blend Average Ignition Voltage | 200 (13.5 Vdc in A/D counts) |
| Recirc Door Calibration Time | 64 (2 sec. in 1/32 sec. increments) |

Example 1: Mode Door Movement from Defrost to Floor

The mode door motor movement results from a close loop operation. As shown in FIG. 1, the normal movement of the mode door 18A spans about 200 degrees from a fully defrost mode position (stop 0) to a fully panel mode position (stop 1). The mode door also is driven in the reverse direction from stop 1 or fully panel to stop 0 or fully defrost mode position. To position the mode door to deflect air through the floor outlet, the mode door must be positioned somewhere in between the two extremes.

Assume that the mode door sits in the defrost position (requested value=00). Now assume that the operator presses the floor button on the climate control display head 12 which causes a request that the mode door be placed in the floor position (requested value=115). The results of equations 1, 1A and 2 for this condition are as follows:

EQUATION 1 (Repeated)
Desired analog motor position = ((Stop 1 − Stop 0)) ×
(Requested Position) ÷ stop 0.
Where:
Stop 1 = Measured analog feedback signal with motor driven to stall in the forward direction.
Stop 0 = Measured analog feedback signal with motor driven to stall in the reverse direction.
Requested position = Value from 0 to 256.
Determining the Requested position Using Equation 1
Requested position = ((921 − 102) × (115 ÷ 256)) + 102 =
((819) × (.449)) + 102 =
367 + 102 = 469

If the current analog feedback signal is not within the required deadband (±10) from the calculated value as determined by the results of equation (1a), the door motor is turned ON for a set time interval based upon Equation (2).

Equation 1A (Repeated)
Error = Current analog feedback position −
desired analog feedback position.
(Note: If Error is positive, move the motor shaft in the forward direction; if the error is negative, move the motor shaft in the reverse direction).
Determining the Error
Error = (469-102) = 367

This indicates that the motor is 367 ADC counts away from the requested position. Since the result is positive, the Mode door motor must be driven in the forward direction.

Equation 2 (Repeated)
Motor ON-Time = ((Current Position − New Position ×
(Calibration Time + (Averaged System Voltage − Current system Voltage))) ÷ (Stop 1 − Stop 0).
Where:
Current Position = Current Analog Feedback Signal.

-continued

New Position = Position Calculated using equation (1).
Calibration Time = Time in 1/32 sec. for door to
travel from reverse stall to forward stall.
Average System Voltage = Summed Voltage ±
(Calibration Time ÷ 4)).
Current System Voltage = Current Measured System
Voltage.
Determining Motor ON-Time
Motor ON Time = ((|102 - 469|) × (192 + (200 - 200))) ÷
(921 − 102) = ((367) × (192)) ÷ (819) =
70464 ÷ 819 = 86.

Since the motor counter is decremented in the motor control firmware which operates at a 1/32 sec. rate, the motor must be ON for 86×32 milliseconds or 2.752 sec. to reach the floor position from the defrost position.

Example 2: Automatic Recirc Door Movement from Full Recirc to Step 1

The Recirc door movement results from open-loop operations. In FIG. 1, Recirc motor 22 regulates outside air and recirculated air and motor 22 moves the Recirc door over a span of 90 degrees. During automatic Recirc operations, MCU 28 provides control signals to move the Recirc door from full Recirc to outside air using 20 individual positions.

The auto Recirc function occurs rarely. Mainly under cool down conditions when the vehicle interior is hot and hot temperatures exist outside. The driver has no control over the auto Recirc function except to cancel it by pressing the Recirc button on the ATC Climate Control Head.

Assume an outside temperature of 90° F. and the vehicle interior temperature of 140° F. When the vehicle operator turns on the ignition switch, the Recirc door will move to the Recirc position to provide maximum cooling capability. As the vehicle interior cools, the Recirc door will begin moving towards the outside air position automatically.

To calculate the Recirc door positions, the following equations are used:

Equation 3 and 3A (Repeated)
Desired Recirc Door Position =
(Requested Position X Calibration Time)/ 256 −
Old Motor On-Time.
Where:
Old Motor On-Time = Length of Time in 1/32 second
that motor was previously turned ON to obtain current position.
Equation 3A
Position Error = Req. position-current position
Determining Requested Position for Step 1 of 20
Desired Position = ((12 × 64)/ 256 = (768/ 256) − 0 = 3
Error = 3 − 0 = 3

This indicates that the motor must be turned ON for 3×32 milliseconds or 96 milliseconds in order to be placed in the desired position. Since the result of this equation is positive, the motor must be turned ON in the forward direction. (Note: The result of equation 3 will be saved in a RAM byte to be used during the next calculation of Equation 3.) Replacing the current position by the Req. position and recomputing Eq. (3) shows that the Error is now 0.

What is claimed is:

1. A motor control system for maintaining a steady comfort level inside a vehicle during various weather conditions, the system including an automatic temperature control (ATC) unit formed in firmware that interacts with a climate control display panel containing an operator controlled temperature control knob for indicating desired temperature settings and a pushbutton for initiating automatic temperature control, the ATC unit also including an ambient air temperature, an in-car temperature and a sun sensor for providing sensed environmental data to the ATC unit, the system also including a heater-ventilation-air conditioning (HVAC) unit containing at least a pair of closed-loop motors with shaft position sensing potentiometers, at least one open-loop motor having a shaft that does not have a position sensing potentiometer, the open-loop motor being used to control movement of a door used to regulate the flow at an outside air inlet and a recirculating air inlet of the vehicle, wherein the HVAC unit also includes an evaporator of an air-conditioning component located in a first chamber containing a blower motor for blowing air directed by the open-loop motor over the evaporator for cooling the air as needed to achieve the desired comfort levels of the vehicle, wherein a first motor of the pair of closed-loop motors being used to direct the air leaving the evaporator through a heater in a first leg of a two-legged, second chamber or through an open channel in a second leg of the second chamber, the first motor of the pair of closed-loop motors also being used to blend the air leaving the second chamber so as to contain a mixture of the air passing through the open channel and the air leaving the heater in the first leg of the second chamber, wherein a second motor of the pair of closed-loop motors being used to deflect the air from the second chamber to a panel outlet, a floor outlet or a defrost outlet in response to signals from the ATC unit, wherein the motor control system controlling direction and time of movement of shafts of the open loop and the pair of closed-loop motors in response to control signals from the ATC unit, the system being used to control normal and fault operation of the open-loop and the pair of closed-loop motors, the motor shafts in the open-loop and the pair of closed-loop motors being connected to linkage for moving the, doors in the HVAC unit, the system containing prestored software data providing time of travel to a normal stall condition and average system voltage relative to the open-loop motor and the first and the second motor of the pair of closed-loop motors being controlled, obtained during a pre-calibration process, the system comprising:

(a) an input power device having terminals for receiving electric power from a designated source and generating therefrom regulated and raw powers used by components in the system, the input device including an ON and OFF switch for applying or removing the powers from the motor control system when desired;

(b) motor drivers having a first set of input terminals for receiving the regulated and raw powers and a second set of input terminals for receiving logical control signals and providing therefrom at output terminals voltage control signals for bi-directional control of movement of the motor shafts in the open-loop and the pair of closed-loop motors in response to the logical control signals;

(c) an external analog-to-digital converter (ADC) having input terminals coupled to the potentiometers of the pair of closed-loop motors which provide analog signal representations of changes in position of the motor shafts and producing therefrom at output terminals digital signal equivalents of the analog signal representations;

(d) a microcontroller having:

(1) a timer system that provides a reference clock signal and operates in conjunction with random access memory (RAM) based counters to provide therefrom at a first output terminal a first clock signal proportioned to the chosen frequency of the reference clock signal and at a second output terminal a second clock signal of another chosen frequency apportioned to the first clock signal;

(2) door motor control firmware containing instructions used by a central processing unit (CPU) of the microcontroller for generating the digital signals used to form the logical control signals sent to the second set of terminals of the motor drivers, the CPU requesting instructions from the door motor control firmware at a rate dictated by the first clock signals;

(3) programmable input/output circuits containing:
(a) programmable output registers for receiving at input terminals the digital signals from the CPU and producing therefrom at output terminals the logical control signals sent to the second set of terminals of the motor drivers, (b) a serial peripheral interface that receives variable digital signals from the external ADC and producing therefrom digital data used by the CPU to establish locations of the structures attached to the motor shafts, (c) an internal ADC for receiving variations of the raw power from the input power device while the motor shaft of the open-loop motor and the first and the second motor of the pair of closed-loop motors rotates and then providing equivalent digital values used by the CPU to derive the average system voltage relative to the open-loop motor and the first and the second motor of the pair of closed-loop motors; and (4) door motor normal and fault operation firmware containing instructions used by the CPU for: (a) computing the time and direction required to move the motor doors connected to the open-loop motor and the pair of closed-loop motors to desired positions for regulating the temperature inside the vehicle in response to requested comfort level indications supplied by the ATC unit, (b) requesting the execution of instructions from the door motor control firmware for turning ON the open-loop motor or the first or second motor of the pair of closed-loop motors and driving its motor shaft with structures attached to desired positions in response to signals from the ATC unit, the CPU requesting instructions from the door motor normal and fault firmware at a rate dictated by the second clock signal.

2. Apparatus in accordance with claim 1 wherein the door motor normal and fault firmware contains instructions arranged to form a state machine wherein the CPU is instructed after determining if calibration has been completed to remain in an initial state (state #1 requiring all motors OFF) until the CPU performs computations of a series of dedicated equations used to determine which motor should turn ON, the direction the motor shaft should rotate and for how long the motor should remain ON; wherein such computations being performed during states #3–#10; wherein after performing the computations, the CPU being instructed to receive instructions from the door motor control firmware to drive the selected motor in the computed direction for the computed time (state 2), wherein the computed time is stored in an ON-time counter in the RAM of the microcontroller and decremented for the stored period of time before the ON-time counter expires (state 2); wherein upon the expiration of the ON-time counter, the CPU returns to state 1 to read instructions from the door motor normal and fault firmware to turn all motors OFF.

3. Apparatus in accordance with claim 2 wherein the door motor control firmware contains instructions arranged to form another state machine wherein the CPU is instructed to wait for the motor request (state 0); wherein upon receiving the motor request the CPU is instructed to drive the selected motor until the ON-time counter expires (state 2), wherein after the ON-time counter expires, the CPU is instructed to turn OFF the motor (state 1).

4. Apparatus in accordance with claim 3 wherein feedback voltage signals from the potentiometers of the pair of closed-loop motors are read by the CPU after the expiration of the ON-time counter and the stabilization of the feedback signals and wherein the ON-time of the first or second motor of the pair of closed-loop motors is a purely time measurement independent of the feedback voltage signal from the potentiometer.

5. Apparatus in accordance with claim 4, wherein the ON-time and direction of each motor shaft movement is calculated mathematically.

6. Apparatus in accordance with claim 5 wherein a desired closed-loop motor shaft position is determined by subtracting a reverse direction feedback voltage ADC count from a forward direction feedback voltage ADC count, then multiplying the result of the subtraction by a requested position value count, then dividing that product by the reverse direction feedback voltage ADC count.

7. Apparatus in accordance with claim 6 wherein the requested position value count is supplied by the ATC unit; wherein the requested position value count can be derived from a setting of the temperature control knob of the climate control display head by the operator or by the ambient air temperature, the in-car temperature and the sun sensors used to sense the environmental conditions.

8. Apparatus in accordance with claim 6 wherein a mathematical relationship is used to determine any error between an analog feedback voltage ADC count of the first or second motor of the pair of closed-loop motors currently being driven and a desired analog feedback voltage ADC count.

9. Apparatus in accordance with claim 8 wherein the motor ON-time for the pair of closed loop motors is determined mathematically.

10. Apparatus in accordance with claim 8 wherein the ON-time is computed by subtracting a computed desired feedback voltage ADC count from the current feedback voltage ADC, then taking the absolute value of the result of the subtraction and multiplying by the sum of the calibration time stored in the RAM which provides the time for the door to travel between end-of-travel stops in both directions, and the difference between the average system voltage and the current system voltage, that sum is then divided by the difference between the stored end of travel analog feedback voltage ADC counts obtained during calibration.

11. Apparatus in accordance with claim 10 wherein the direction and amount of ON-time of the open-loop motor is determined mathematically, wherein the motor shaft position of the open-loop motor rests either in a 100% outside air position or a 100% Recirc air position, wherein the open-loop motor is turned ON for a fixed duration so as to rotate the motor shaft to the opposite motor shaft position if the requested door position does not equal the current door position.

12. Apparatus in accordance with claim 11 wherein the loop-open motor operates automatically if the ATC unit using the sensors that sense the environmental conditions determines a requested door position for the door attached to the shaft of the open-loop motor system.

13. Apparatus in accordance with claim 12 wherein the door motor normal and fault operation firmware instructs the CPU to request instructions from the door motor control firmware to move the motor shaft of the open-loop motor to the 100% Recirc air position to provide maximum cooling capability; and wherein the vehicle interior cools, the door motor normal and fault operation firmware provides instructions to the CPU to begin moving the motor shaft of the open-loop motor to the 100% outside air position automatically for a calculated period of time that provides the desired interior temperature.

14. Apparatus in accordance with claim 13 wherein the motor shaft of the open-loop motor moves to the 100% outside air position in a fixed number of incremental steps.

15. A method for controlling the normal and fault operations of a hybrid motor control system used to direct the flow of air through a heater-ventilation-air conditioning (HVAC) unit, the hybrid motor control system including at least one open-loop motor and at least two closed-loop motors, the system being provided requested motor control positions originating from an operator controlled control panel or from an output of an automatic temperature control (ATC) unit, the method comprising the steps of:

(a) providing an external analog-to-digital converter (ADC) connected to potentiometers of at least two closed-loop motors for converting potentiometer voltage values to shaft position data;

(b) keeping the at least one open-loop motor and at least two closed-loop motors turned OFF while waiting for a request to change the door motor shaft positions in the HVAC unit;

(c) upon receipt of the request, determining mathematically which motor to select and turn ON, the direction the shaft of the selected motor should be turned, and the time that the selected motor should be turned ON;

(d) storing the time that the selected motor should be turned ON in an ON-time counter;

(e) decrementing the ON-time counter simultaneously with driving the selected motor until the time stored in the ON-time counter expires;

(f) turning OFF the selected motor when the time stored in the ON-time counter expires; and (g) for one of the at east two closed-loop motors, measuring the potentiometer feedback voltage after the expiration of the time stored in the ON-time counter.

16. The method of claim 15 wherein the open-loop motor is automatically controlled if abnormal temperatures occur outside and interior of the vehicle to bring the interior of the vehicle to a desired comfort level determined by the ATC unit; wherein the open-loop motor shaft moves from a 100% Recirc air position to a 100% outside air position in a fixed number of incremental steps.

* * * * *